US012638397B2

(12) United States Patent
Reuss

(10) Patent No.: US 12,638,397 B2
(45) Date of Patent: May 26, 2026

(54) METHOD FOR LOCALIZING AND TRACKING EMITTERS IN A SAMPLE

(71) Applicant: Abberior Instruments GmbH, Gottingen (DE)

(72) Inventor: Matthias Reuss, Gottingen (DE)

(73) Assignee: ABBERIOR INSTRUMENTS GMBH, Gottingen (DE)

( * ) Notice: Subject to any disclaimer, the term of this patent is extended or adjusted under 35 U.S.C. 154(b) by 154 days.

(21) Appl. No.: 18/798,349

(22) Filed: Aug. 8, 2024

(65) Prior Publication Data

US 2025/0052682 A1      Feb. 13, 2025

(30) Foreign Application Priority Data

Aug. 11, 2023    (DE) ..................... 10 2023 121 626.0

(51) Int. Cl.
| | | |
|---|---|---|
| *G01N 21/64* | (2006.01) | |
| *G01N 21/17* | (2006.01) | |
| *G01N 21/47* | (2006.01) | |
| *G02B 21/06* | (2006.01) | |

(52) U.S. Cl.
CPC ......... *G01N 21/6458* (2013.01); *G01N 21/47* (2013.01); *G02B 21/06* (2013.01); *G01N 2021/178* (2013.01)

(58) Field of Classification Search
CPC .............. G01N 21/6458; G01N 21/47; G01N 2021/178; G02B 21/06; G02B 21/0032; G02B 21/0076; G02B 21/16
See application file for complete search history.

(56) References Cited

U.S. PATENT DOCUMENTS

| | | | |
|---|---|---|---|
| 2012/0104279 A1 | 5/2012 | Reuss et al. | |
| 2017/0362630 A1* | 12/2017 | Kiuchi ..................... | C07K 1/13 |
| 2021/0063714 A1* | 3/2021 | Fahrbach ............... | G02B 21/24 |
| 2023/0101017 A1 | 3/2023 | Fischer et al. | |

FOREIGN PATENT DOCUMENTS

| | | |
|---|---|---|
| CN | 112485232 B | 4/2022 |
| CN | 118010692 A | 5/2024 |
| DE | 10 2015 105 018 A1 | 10/2016 |

(Continued)

OTHER PUBLICATIONS

In lieu of English Translation of Schonle et al. DE-10-2022-119-327-B4, Description from corresponding PGPub (Year: 2024).*

(Continued)

*Primary Examiner* — Tarifur R Chowdhury
*Assistant Examiner* — Akbar H. Rizvi
(74) *Attorney, Agent, or Firm* — MOSER TABOADA

(57) ABSTRACT

The present disclosure relates to a method for localizing or tracking individual emitters in a sample according to the MINFLUX principle, wherein the sample is illuminated at several illumination positions in a close range around the emitter from different illumination directions with modulation light which comprises a linearly or flatly extended intensity minimum. A position of the emitter in the sample is calculated from the emissions of the emitter detected at the illumination positions. The invention further relates to a light microscope for carrying out the method.

22 Claims, 10 Drawing Sheets

(56) References Cited

FOREIGN PATENT DOCUMENTS

| DE | 10 2019 008 304 | B3 |   | 3/2021 |   |
|----|----|----|----|----|----|
| DE | 102021100564 | B4 | * | 12/2023 | ......... G02B 21/0076 |
| DE | 10 2022 119 304 | A1 |   | 2/2024 |   |
| DE | 102022119327 | B4 | * | 3/2024 | ........... G06V 10/141 |
| EP | 3 372 990 | B1 |   | 3/2021 |   |
| EP | 4 167 010 | A1 |   | 4/2023 |   |
| WO | WO 2020/128106 | A1 |   | 6/2020 |   |
| WO | WO 2021/111187 | A2 |   | 6/2021 |   |

OTHER PUBLICATIONS

English Translation of Schmidt DE-10-2021-100-564-B4 Description (Year: 2023).*

German Search Report for Application No. 10 2023 121 626.0 dated Jul. 26, 2024.

Balzarotti et al. in "Nanometer resolution imaging and tracking of fluorescent molecules with minimal photon fluxes", Science 355, 2017, 80 pages, (6325), http://science.sciencemag.org/.

Balzarotti et al. in "Nanometer resolution imaging and tracking of fluorescent molecules with minimal photon fluxes",Physics. Optics, 2016, 85 pages, arXiv:1611.03401.

M. Blum et al, "Compact optical design solutions using focus tunable lenses", SPIE Optical Design and Engineering IV, Proceedings, 2011, 9 pages, vol. 8167, 81670W.

T. Imai et al, Fast Varifocal Lenses Based on KTa1—xNbxO3 (KTN) Single Crystals, Special Feature: KTN Crystal Technologies, NTT Technical Review, Dec. 2009, pp. 1-5, vol. 7 No. 12.

Hung-Chun Lin et al., "An electrically tunable-focusing liquid crystal lens with a low voltage and simple electrodes", Optics Express, 2012, pp. 2045-2052, vol. 20, No. 3.

Luciano A. Masullo. et al., "Pulsed Interleaved Minflux" Nano Letters 21, 2021, pp. 840-846, https://dx.doi.org/10.1021/acs.nanolett. 0c04600.

Yu et al, "Super-resolution deep imaging with hollow Bessel beam STED microscopy", Laser & Photonics Review, 2016, 13 pages, DOI: 10.1002/lpor.201500151.

* cited by examiner $$(x, z) = \left( \frac{x_1 \tan\theta_2 + x_2 \tan\theta_1}{\tan\theta_1 + \tan\theta_2}, \frac{x_1 - x_2}{\tan\theta_1 + \tan\theta_2} \right)$$

$$(x, y, z) = \left( \frac{x_1 (\sin \varphi_2 - \sin \varphi_3) + y_2 - y_1}{\sin \varphi_2 - \sin \varphi_3}, \frac{y_2 \sin \varphi_2 - y_1 \sin \varphi_3}{\sin \varphi_2 - \sin \varphi_3}, \frac{(y_2 - y_1) \tan \theta}{\sin \varphi_2 - \sin \varphi_3} \right)$$

METHOD FOR LOCALIZING AND TRACKING EMITTERS IN A SAMPLE

CROSS-REFERENCE TO RELATED APPLICATIONS

The present application claims the benefit of and priority to DE Patent Application Serial No. 10 2023 121 626.0, filed Aug. 11, 2023, the entire contents of which is incorporated herein by reference.

TECHNICAL FIELD OF THE INVENTION

The invention is directed to a method and a light microscope for localizing and tracking individual emitters in a sample according to the MINFLUX or STED-MINFLUX principle. Compared to MINFLUX methods known from prior art, the method according to the invention and the light microscope according to the invention allow three-dimensional localization of emitters in a sample without having to illuminate the sample in different illumination planes.

PRIOR ART

The term MINFLUX methods covers localization and tracking methods for individual emitters in which light distributions of illumination light, which excites light emissions of the emitter, are generated at the focus in the sample, wherein the light distributions comprise a local minimum, and in which the position of an individual emitter is determined by detecting light emissions of the emitter for different positions of the minima of the respective light distributions or for different such light distributions in a close range of the emitter. Therein, in particular, it is utilized that the smaller the distance between the emitter and the minimum of the light distribution, the less light is emitted by the emitter. At the minimum itself, the emitter should be stimulated to emit as little as possible so that the increase in emission with increasing distance from the minimum of the light distribution is as large as possible in relation to the emission. Due to the latter fact, MINFLUX methods are particularly photon-efficient, especially in comparison to localization methods based on spatially resolved detection of the emission, such as PALM or STORM microscopy. This means that MINFLUX methods achieve a particularly high localization accuracy with the same number of detected photons. This means that the emitters to be localized or tracked with the desired accuracy can be exposed to relatively little light compared to other localization methods and are therefore less bleached.

The term "MINFLUX" was introduced by Balzarotti et al. in "Nanometer resolution imaging and tracking of fluorescent molecules with minimal photon fluxes", Science 355 (6325), 606-612 (2017) and previously in arXiv: 1611.03401 [physics.optics] (2016). In the method described there, the MINFLUX principle is specifically implemented by identifying small structures comprising stochastically blinking fluorophores in a wide-field image and moving them as precisely as possible into the center of the wide-field image and then scanning the center area with a donut-shaped excitation light distribution in the center and at other points that form a symmetrical pattern of illumination positions around the center using electro-optical scanners. The positions of the individually blinking fluorophores of the structures are then determined to within a few nanometers from the photon counts registered for the individual illumination positions using a maximum likelihood estimator. For the same number of detected photons, the smaller the area delimited by scanning positions in which the fluorophore to be localized is located, the higher the accuracy. It is therefore advantageous to carry out MIN-FLUX iteratively on single fluorophores, wherein the delimited area is reduced from step to step.

European patent EP 3 372 990 B1 describes a related method, now known as "STED-MINFLUX". As in a MIN-FLUX method, an individual emitter is illuminated with a light distribution that comprises a central intensity minimum (particularly a zero point) and intensity increase areas surrounding this minimum. Also as with MINFLUX, this minimum is placed at a number of scanning points around the presumed location of the individual molecule, and a fluorescence emission is detected for each scanning point. The position of the emitter is estimated with high precision from the fluorescence intensity values or photon counts obtained in this way. In contrast to MINFLUX, however, the light distribution is not a distribution of excitation light, but a distribution of fluorescence inhibition light, in particular stimulation or STED light. This is used together with (additional) excitation light, wherein the intensity distribution of the excitation light does not have a central local minimum. Whereas with MINFLUX the fluorescence emission is higher when the individual emitter is further away from the central minimum of the intensity distribution, the opposite is true with this method.

All MINFLUX methods known from the prior art have in common that for a three-dimensional localization of the emitters it is necessary to illuminate the sample at illumination positions not only within one illumination plane (in particular the focal plane), but at illumination positions distributed in all spatial directions. For example, the publication DE 10 2021 100 564 A1 discloses a MINFLUX method for high-resolution localization of an emitter in three spatial directions, in which the intensity minimum of the excitation light is placed at two axial positions in an axial localization step and the intensity minimum is placed exclusively in a scanning pattern plane in a lateral localization step.

Patent application WO 2021/111187 A2 discloses a method for the three-dimensional localization of light-emitting objects, in which the object is illuminated along a first projection direction with a plurality of first light distributions having a common intensity zero point and the light distributions are shifted so that the light emission of the object becomes minimal, so that the resulting position of the light distributions characterizes the position of the object in two spatial directions. Furthermore, in the method, the light emitted by the object is shaped with an optical module so that the shape of the light emission depends on the axial position of the object, and the axial position of the object is determined from the spatial distribution and the total intensity of the light emissions. In a further embodiment of the method, the object is illuminated along a second projection direction with several second light distributions having a common intensity zero point with the first light distributions, and the light distributions are shifted until the light emission of the object becomes minimal, so that the resulting position of the light distributions characterizes the position of the object in all three spatial directions.

The patent application US 2023/0101017 A1 discloses a method and a light microscope for parallelized MINFLUX microscopy, wherein a programmable micromirror array is used to generate several light distributions in the sample, which can be positioned independently of each other and each comprise an intensity minimum, in order to be able to simultaneously localize several emitters in the sample according to a MINFLUX method. The document also suggests generating light distributions inclined with respect to the optical axis by interference of beams of different diffraction orders, which are generated by locally limited optical gratings presented on the micromirror array. The light distributions should then be spatially superimposed in order to simulate a light distribution with a minimum along the optical axis-similar to that of a bottle beam—which enables three-dimensional localization of the emitter.

Various technical implementations for a fast focus shift in the axial direction are described in the state of the art, but these are technically challenging to realize and costly. In "Fast response varifocal lenses using $KTa_{1-x} Nb_x O_3$ crystals and a simulation method with electrostrictive calculations", *Appl. Opt.* 51 (10), 1532-1539 (2012), T. Imai et al. describe a Kerr lens based on a potassium tantalate niobate (KTN) single crystal, which is now also commercially available and whose focal length can be shifted by almost 90 mm on a time scale of a few microseconds, although this requires switching voltages of several 100 V.

The publication EP 4 167 010 A1 discloses a device with a polarization-switching optical element that can switch a linear polarization of an incident light beam between two output polarizations in accordance with a switching signal, and with a focusing optical element that axially shifts the focus position of the focused light beam as a function of the output polarization of the polarization-switching optical element. According to an embodiment, the polarization-switching optical element is configured as a Pockels cell and the focusing optical element is designed as a birefringent lens.

Lenses with adjustable focal lengths may also be configured as liquid lenses in which a liquid optical medium is enclosed by transparent membranes. By varying the distance between the membranes at a constant liquid volume, the curvature of the membrane surfaces can be varied from concave to convex and thus the focal length of the lens can be varied over a wide range [see, for example, M. Blum et al, "Compact optical design solutions using focus tunable lenses", *SPIE Optical Design and Engineering IV*, Proceedings Vol. 8167, 81670W (2011)]. With a moving coil drive, such arrangements can achieve switching times in the range of a few milliseconds. However, a major disadvantage of tunable liquid lenses is that they usually exhibit gravity-induced coma aberrations when operated in an upright position.

Another class of electrically tunable lenses are liquid crystal lenses whose focal length results from a spatially varying refractive index of differently aligned liquid crystals, wherein the alignment is controlled by applied electric fields [see, for example, H.-C. Lin and Y.-H. Lin in "An electrically tunable-focusing liquid crystal lens with a low voltage and simple electrodes", *Opt. Expr.* 20 (3), 2045-2052 (2012)].

Objective of the Invention

It is now the objective of the present invention to provide a method and a light microscope which permits localization of emitters in a sample according to a MINFLUX method or STED-MINFLUX method, also in three dimensions, wherein the illumination positions can all be arranged in an illumination plane, in particular in a focal plane.

Solution

This objective is attained by the subject matter of independent claims. Advantageous embodiments of the method and the light microscope are given in the subclaims and are described below.

Definitions

In this application, emitters are understood to be objects which, when illuminated with excitation light, can be regarded as point light sources with regard to the measurements according to the present disclosure. The light emitted by the object which acts as a point light source may, for example, be scattered light resulting from elastic scattering such as Rayleigh scattering or inelastic scattering such as Raman scattering, or it may be luminescent light, in particular fluorescent light. It is essential for an emitter that it emits light immediately or with a short time delay in response to illumination. If movements of the emitter are to be tracked, the maximum time delay is related to the temporal resolution with which the movements of the light-emitting particles or light-emitting units are to be tracked and to the speed at which the particles or units move in the sample. The time delays may be up to about 10 µs but are usually in the range up to a few tens of nanoseconds, often in the range of 1 to 10 ns and, if the emission is scattered light, zero.

Emitters may be metallic nanoparticles, for example. The term fluorescence emitter includes, for example, individual fluorescent dye molecules or their fluorescent chemical groups. Instead of dyes, other fluorescent units such as quantum dots or up-converting nanoparticles may also be used for labeling. Accordingly, in the context of the application, excitation light is understood to mean not only fluorescence excitation light, but generally such light that causes light to be emitted from an emitter.

In the context of the application, an emitter is designated as individual if a distance to a neighboring emitter from which it cannot be distinguished optically is at least as great as a distance corresponding to the resolution of the optical arrangement with which the emissions are detected when the method is carried out.

In this application, modulation light is understood to mean light that influences the light emission of an emitter in any desired way by amplifying or attenuating it. The modulation light can therefore excite, amplify, reduce/inhibit or completely suppress the light emission. This definition includes that the modulation light may also be excitation light that stimulates the emitter to emit light and may also replace the excitation light as a separate light. The modulation light may alternatively be emission suppression light that attenuates the emission of the emitter, in particular stimulation or STED light that induces stimulated emission from an electronically excited state of the emitter, wherein the emitter is transferred (back) to the electronic ground state and thus prevented from spontaneous (fluorescence) emission.

In this application, an illumination plane is understood to be a plane in which the excitation and/or modulation light is positioned when the sample is illuminated. The term position refers to the nominal (geometric) position of the light focus in the sample. For a Gaussian intensity distribution, the position thus corresponds to the point of maximum intensity. The intensity distributions of the modulation light dealt with in this application regularly exhibit linear or planar intensity minima at the location of the geometric focus; the geometric focus point is also regarded as the position of the intensity distribution for these intensity distributions.

In this application, an illumination line is understood to be the corresponding case of the illumination plane reduced to two dimensions, i.e. a straight line in an illumination plane.

DESCRIPTION

A first aspect of the present disclosure relates to a method for locating or tracking an individual emitter in a sample. In the method, the sample is illuminated through an objective lens, wherein the illumination is performed with excitation light which excites the individual emitter to emit light and with modulation light which attenuates, amplifies or excites the light emission of the emitter. In particular, the modulation light may be excitation light or emission or fluorescence suppression light, as is known from STED microscopy, for example.

According to the present disclosure, an intensity distribution which comprises an intensity minimum extended along a minimum line or a minimum area, in particular a zero line or a zero area, is formed in the sample with the modulation light. Perpendicular to the minimum line or the minimum area, the intensity distribution comprises intensity increase areas. Methods for forming such intensity distributions in the sample are known to the skilled person from the prior art, including prior art from STED microscopy and MINFLUX microscopy. For example, a light beam whose wavefront is subjected with an azimuthal phase gradient of 0 to $2\pi$ (or a multiple of $2\pi$) (for example by arranging a vortex phase plate in a light path of the modulation light), forms in the sample a ring-shaped intensity distribution comprising a zero line along the optical axis of the objective lens when focused by the objective lens.

If, on the other hand, one half of the wavefront of the light beam is delayed by $\pi$ with respect to the other half of the wavefront (for example by arranging a split phase plate in a light beam of the modulation light, which comprises a phase jump of $\pi$), an intensity distribution with two intensity maxima laterally offset from the geometric focus, which are separated by a zero plane containing the optical axis, is formed in the sample when focusing with the objective lens.

Ideally, the gradient in the intensity increase regions is homogeneous in the direction of the minimum line or in an extension direction of the minimum area, i.e., the intensity of the modulation light is constant at a given distance from the minimum line or the minimum area in the direction of the minimum line or in the extension direction. This makes it easier to calculate the position of the emitter in the sample, as described in more detail below. In practice, a homogeneous gradient can only be realized approximately and only over a limited range of the intensity distribution; when using objective lenses with a high numerical aperture, this range usually extends over one to a few micrometers. Optionally, this range may be extended to over 100 micrometers by designing the modulation light as a Bessel light beam, see for example Yu et al, "Super-resolution deep imaging with hollow Bessel beam STED microscopy", *Laser Photon. Rev.* 10 (1), 147-152 (2016).

In one step of the method according to the present disclosure, the intensity distribution of the modulation light is positioned at several illumination positions in a close range around the emitter, and light emissions from the emitter are detected for the illumination positions.

The term "illumination position" refers to a fixed reference point with regard to the intensity distribution of the modulation light. The illumination positions may be discrete positions at which the intensity distribution is positioned one after the other, but the illumination positions may also be points along a continuous path in the sample. In any case, the light emissions of the emitter are detected for the illumination positions, i.e., emission events or light intensities and positions are assigned to each other. For this purpose, the intensity distribution may be positioned at an illumination position and a quantity of light emission may be measured at this illumination position for the duration of an integration time; the illumination position is then a parameter of the measurement and the light emission is the measured value. Conversely, the current illumination position can also be measured as soon as an emission event is registered; the illumination position is then the measured value.

In particular, the close region has dimensions in the size range of the optical diffraction limit, with the close region being centered in particular at the (presumed) position of the emitter. In particular, the close region extends in one spatial direction over no more than a small multiple of the diffraction limit (at a given wavelength of the light emitted by the emitter), further in particular ten times, further in particular five times, further in particular two times, further in particular 1.5 times, the diffraction limit. In particular, the diffraction limit may correspond to the diameter of an Airy disk.

In a further step of the method according to the present disclosure, a position of the emitter in the sample is calculated from the emissions detected for the illumination positions, in which the method is similar to the MINFLUX and STED-MINFLUX methods known from the prior art. However, it differs from these and is characterized by the fact that the sample is illuminated with the modulation light from different illumination directions during the detection of the light emissions. The illumination can take place at different angles of inclination, i.e., at different angles that the minimum line or the minimum area of the intensity distribution of the modulation light forms with the sample-side (xy) focal plane or the optical (z) axis of the objective lens. The illumination with the modulation light may additionally or alternatively also take place at different azimuth angles, i.e., by rotating the minimum line or the minimum area of the intensity distribution of the modulation light around the optical (z) axis. A complete indication of the illumination direction in which the sample is illuminated with the modulation light comprises the angle pair $(\varphi, \theta)$ (azimuth angle, inclination angle) in three-dimensional space.

According to the present disclosure, the light emissions of the emitter are detected under illumination with the modulation light from at least two different illumination directions, wherein the light emissions are assigned or can be assigned to the different illumination directions of the modulation light. For example, light emissions can first be collected for a first direction of illumination and then be collected for a second direction of illumination. It is also possible to record the light emissions in an alternating manner to the illumination directions.

The light emissions can be assigned to the direction of illumination, for example, by registering the respective azimuth and/or inclination angle for each light emission. Since the illumination is usually performed from a small number of illumination directions, an index characterizing the illumination direction is also particularly suitable for the assignment.

The number of illumination directions under which light emissions from the emitter are detected determines the number of spatial directions in which the position of the emitter in the sample can be calculated. When illuminating the sample from two illumination directions, the emitter can be localized in two dimensions; when illuminating the sample from three illumination directions, the emitter can be localized in all three dimensions. In addition, it may be useful to detect light emissions under further illumination directions in order to reduce the uncertainty with which the position of the emitter in the sample can be determined.

The illumination directions particularly comprise angles of inclination between 20° and 60°, more particularly between 30° and 45° to the optical axis. Inclination angles in this range are technically easy to realize and are optimal with regard to the localization of the emitter in the direction of the optical axis. In the azimuthal direction, the illumination directions are particularly arranged evenly around the optical axis, for example with $\varphi=0°$, 180° and for two illumination directions or at $\varphi=0°$, 120°, 240° for three directions of illumination.

In a further embodiment of the method, the modulation light acts as excitation light, and in the sense of the present disclosure it represents both the modulation light and the excitation light. It is therefore not necessary for the modulation light and the excitation light to be different from one another; rather, both functions "excitation of an emission of the emitter" and "modulation of the emission" may also be fulfilled by the same light from a common light source.

According to a further embodiment of the method, the illumination positions are located on an illumination line oriented in particular perpendicular to the optical axis or in an illumination plane oriented in particular perpendicular to the optical axis. The illumination plane is particularly a lateral (xy) plane, in particular the (specimen-side) focal plane of the objective lens.

According to a further embodiment of the method, the calculation of the position of the emitter in the sample includes a calculation of the distance from the emitter to the illumination line or the illumination plane, including the information on which side of the illumination line or the illumination plane the emitter is located. In this respect, the distance is normally to be regarded as having a sign. In particular, the distance to the illumination plane corresponds to the z-coordinate of the emitter if the illumination plane is the sample-side (xy) focal plane of the objective lens. In this embodiment, a particular advantage of the method according to the present disclosure over known MINFLUX methods from the prior art becomes apparent: Even for a localization of the emitter in all spatial directions, it is not necessary to shift the intensity distribution in the direction of the optical axis, so that the method can be carried out with a beam scanner of a conventional laser scanning microscope, for example a Galvo scanner.

In one embodiment of the method, the inclination and azimuth angles characterizing the different illumination directions are measured in a calibration step preceding the method and the position of the emitter in the sample is calculated using the measured angles. The illumination directions, each defined by an inclination angle and an azimuth angle, can be determined from images of the intensity distribution generated by scanning the intensity distribution with a light-scattering nanoparticle in the sample using raster scanning. This type of experimental determination of the intensity distribution in the sample is familiar to the skilled person from STED microscopy, for example.

If the inclination angles can be set sufficiently reproducibly, are stable over time and are not distorted by sample-induced aberrations, the calibration step can be carried out once and the inclination angles characterizing the illumination directions and an azimuth angle can be stored for later use. Alternatively, the illumination directions can be determined immediately before carrying out the method according to the present disclosure. For this purpose, light-scattering nanoparticles can be introduced directly into the sample as auxiliary objects, so that the directions of illumination are determined under the same conditions under which the method for localizing the emitters is carried out.

According to a further embodiment of the method, apparent positions of the emitter are calculated from subsets of light emissions, each of which is detected under illumination from the same illumination directions of the modulation light, and the position of the emitter in the sample is calculated from the apparent positions. In particular, in this embodiment, the position of the emitter in the sample can be calculated in at least one spatial direction more than the apparent positions. To illustrate this, the two-dimensional case is illustrated here, in which an emitter and the minimum line of the light distribution of the modulation light are all located in the xz plane, i.e. y=0. The emitter is illuminated successively from two directions in the xz plane ($\varphi_1=0°$ and $\varphi_2=180°$), wherein the inclination angles $\theta_1$, $\theta_2$ may be equal or different in magnitude but are inclined in opposite directions to the optical axis.

For each of the two illumination directions, the sample is illuminated at several illumination positions in the focal plane (i.e. at z=0) around the emitter, and the position of the emitter is localized from the light emissions detected at the illumination positions. The position estimators known from the prior art for MINFLUX microscopy can be used for this purpose. However, these position estimators do not provide the actual position of the emitter in the sample, but rather projections of its actual position (x, 0, z) in the (xy) focal plane in the direction of the minimum line of the intensity distribution. The x-coordinate of these apparent positions ($x_i$, 0) deviate from the x-coordinate of the actual position (x, 0, z) the greater the distance of the emitter from the focal plane.

From FIG. 4, the following relationships between the inclination angles $\theta_1$, $\theta_2$, the apparent positions $x_1$ and $x_2$ and the position of the emitter (x, z) can be seen:

$$z \tan\theta_1 = x_1 - x \tag{1}$$

$$z \tan\theta_2 = x - x_2 \tag{2}$$

Thereby, the position (x, z) of the emitter in the sample may be calculated by $$(x, z) = \left( \frac{x_1 \tan\theta_2 + x_2 \tan\theta_1}{\tan\theta_1 + \tan\theta_2}, \frac{x_1 - x_2}{\tan\theta_1 + \tan\theta_2} \right).$$

In order to localize the emitter in three spatial directions, it is necessary to illuminate the emitter from at least one further illumination direction and to determine a further apparent position. In one embodiment of the method, the emitter is illuminated from three azimuth angles arranged uniformly around the optical axis $\varphi_1=0°$, $\varphi_2=120°$, $\varphi_3=240°$ at a constant angle of inclination $\theta$. (By convention, the inclination angle in this example is the angle between the minimum line of the intensity distribution and the xy plane). The following applies to the three directions of illumination according to FIG. 5:

$$z = (x - x_1)\tan\theta \quad \text{for } \varphi_1 = 0° \tag{1}$$

$$z\sin\varphi_2 = (y - y_2)\tan\theta \quad \text{for } \varphi_2 = 120° \tag{2}$$

$$z\sin\varphi_3 = (y - y_3)\tan\theta \quad \text{for } \varphi_3 = 240° \tag{3}$$

Solving this system of equations for the coordinates of the emitter in the sample gives the following result:

$$(x, y, z) =$$

$$\left( \frac{x_1(\sin\varphi_2 - \sin\varphi_3) + y_2 - y_1}{\sin\varphi_2 - \sin\varphi_3}, \frac{y_2\sin\varphi_2 - y_1\sin\varphi_3}{\sin\varphi_2 - \sin\varphi_3}, \frac{(y_2 - y_1)\tan\theta}{\sin\varphi_2 - \sin\varphi_3} \right)$$

The accuracy of the position determination may be further improved by illuminating the sample in additional illumination angles. The system of equations that is then overdetermined will be solved approximately by the skilled person, for example by minimizing the error sum of squares.

In a further embodiment, the method is applied iteratively, wherein the position uncertainty of the calculated position of the emitter decreases from one iteration to the next. This takes advantage of the fact that the apparent positions approach each other and the actual position of the emitter in the sample, when the distance of the emitter to the illumination line or the illumination plane decreases. Specifically, this embodiment of the method comprises the following steps:

i. detecting light emissions for a plurality of illumination positions of the modulation light in a close range around the emitter and calculating the position of the emitter in the sample from the light emissions detected for the illumination positions in a first iteration of the method, ii. displacing the illumination line or the illumination plane so that the distance of the emitter from the illumination line or the illumination plane is reduced, iii. detecting light emissions for a plurality of illumination positions of the modulation light in a close range around the emitter and calculating the position of the emitter in the sample from the light emissions detected for the illumination positions in a second iteration of the method, wherein the position of the emitter is calculated with a reduced position error compared to the first iteration.

The advantage of this iterative embodiment of the method is that an exact localization of the emitter is possible even if the tilt and azimuth angles characterizing the illumination directions are not known or not known exactly. Then, in the first iteration (step i), a position of the emitter can be calculated using imprecise or even estimated tilt and azimuth angles, which is subject to a possibly large error, but allows the illumination line or the illumination plane to be shifted so that the distance of the emitter from the illumination line or the illumination plane is reduced (step ii). In the subsequent second iteration (step iii), the apparent positions are closer together in accordance with the above, so that the position of the emitter can be calculated with a reduced position error compared to the first iteration, despite the only approximately known inclination and azimuth angles.

Optionally, further iterations may be performed, wherein the apparent positions converge towards the actual position of the emitter (and thus towards each other) in the sample. In particular, further iterations can be carried out until the distance between the apparent positions or the position uncertainty with which the position of the emitter is calculated falls below a threshold or does not decrease any further compared to the previous iteration. Particularly, this threshold of the position uncertainty is 10 nm, more particularly 5 nm and even more particularly 2 nm.

The illumination direction in which the sample is illuminated with the intensity distribution of the modulation light can be changed, for example, by shifting a phase distribution or intensity distribution of the modulation light in a rear pupil of the objective lens. For example, the center of a helical phase distribution, which leads to the formation of a donut mode in the sample when focused by the objective lens, can be shifted relative to the center of the rear pupil of the objective lens, with the amount of the shift determining the inclination angle of the minimum line or the minimum area of the intensity distribution of the modulation light relative to the optical axis and the direction of the shift determining the direction in which the intensity distribution in the sample is inclined. Alternatively, the modulation light beam may be shifted in the rear pupil of the objective lens so that the pupil of the objective lens is no longer homogeneously illuminated, but only partially and/or with an intensity gradient.

According to a further embodiment of the method, the phase distribution or the intensity distribution of the modulation light is displaced in a pupil of the objective lens using a beam scanner. For this purpose, the beam scanner may particularly comprise two deflection elements which deflect the modulation light beam in the same deflection direction in order to adjust the position and the angle of entry of the modulation light beam into the pupil of the objective lens independently of one another.

According to a further embodiment of the method, the phase distribution or the intensity distribution of the modulation light in a pupil of the objective lens is changed with a programmable spatial light modulator (SLM) in order to illuminate the sample with the modulation light in different illumination directions. In particular, pixelated liquid crystal modulators operated in phase or amplitude modulation mode can be used as light modulators in a beam path of the modulation light. The center of the phase pattern can be shifted by suitable control of the light modulator on its active surface, so that the phase pattern is shifted in a pupil of the objective lens. Alternatively, the phase pattern can be superimposed by the light modulator with different (linear) phase gradients, whereby the modulation light beam is deflected in different directions depending on the direction of the phase gradient and shifted in a pupil of the lens. A shift of the modulation light beam in a pupil of the lens may also be achieved with a programmable deformable mirror in the beam path of the modulation light.

According to a further embodiment of the method, the sample is illuminated with the modulation light from different illumination directions by alternately illuminating the sample with different beams of the modulation light. The beams may differ in the phase pattern imprinted on their wavefront or also in the position of the beams in a pupil of the objective lens. The decisive factor is that the different beams of modulation light illuminate the sample from different illumination directions when focused by the lens. For example, the modulation light beam can alternatively be directed through one of two different light paths with the aid of a polarization rotator, in particular a Pockels cell, and a downstream polarization beam splitter, wherein different (vortex) phase plates or light modulators are located in the light paths or arranged differently relative to the modulation light beam. The modulation light beams from both light paths can be reunited with the aid of a second polarization beam splitter and directed further along a common light path to the objective lens. By (rapidly) switching the modulation light between orthogonal polarization states with the polarization rotator, the sample can be alternately illuminated in different illumination directions.

The method according to the present disclosure can be carried out once or several times on an individual emitter. In a further embodiment for single particle tracking, the method is carried out repeatedly on a single emitter or on several emitters, each of which binds to an object in the sample one after the other, and a three-dimensional trajectory of the emitter or the object is created from the calculated positions of the emitter or the emitters. The trajectory of the single emitter itself may be of interest, but the emitter or emitters may also be merely markers for the object whose trajectory is to be determined. In particular, the object may be successively marked with a large number of emitters (of the same type) in order to extend the length of the trajectory beyond the photobleaching of one emitter. The skilled person can find corresponding methods for the serial staining of an object in a sample in the prior art for PAINT microscopy.

In a further embodiment of the method, a plurality of individual emitters are localized in the sample and an image is generated from the calculated positions of the emitters. Suitable methods for generating an image from the positions of individual emitters are familiar to the skilled person from the prior art of PALM, STORM and MINFLUX microscopy. In particular, the image representation may be a projection of the positions in a two-dimensional image plane or a two-dimensional representation in two directions in which the third spatial direction is color-coded. The image representation may also be a stereoscopic spatial representation, in particular generated by projection onto a (partially) transparent projection surface or by display in data goggles.

This embodiment may also be modified such that a plurality of emitters transiently bind to a plurality of binding sites on a structure in the sample, wherein the binding sites can be occupied by only one emitter at any given time. The exchange of emitters at the binding sites makes it possible to detect more light emissions at the binding sites than is possible with a single, permanently bound emitter whose light emission is limited due to photobleaching. Due to the increased amount of light emissions, the localization of the individual emitters can be carried out with improved accuracy.

A second aspect of the present disclosure relates to a light microscope for localizing or tracking an individual emitter in a sample, in particular for carrying out a method according to one of the preceding claims. For this purpose, the light microscope comprises a light source for excitation light, which is adapted to excite the individual emitter in the sample to emit light.

a light source for modulation light, which is adapted to attenuate, amplify or excite the light emission of the emitter in the sample, an objective lens configured to illuminate the sample with the excitation light and the modulation light, optical means which are configured to form an intensity distribution of the modulation light in the sample in such a way that the intensity distribution comprises an intensity minimum extended along a minimum line or a minimum area, in particular a zero line or a zero area, a scanner which is configured to position the intensity distribution of the modulation light in the sample at different illumination positions in a close range around the emitter and a detection device which is configured to detect light emissions from the emitter for the illumination positions.

The scanner is used to shift the intensity distribution of the modulation light relative to the sample. In this respect, the scanner may also be a sample scanner that shifts the sample relative to a fixed intensity distribution of the modulation light. The scanner may also be arranged in a common beam path of the excitation light and the modulation light and displace both beams together.

The light microscope according to the present disclosure is characterized in that it comprises means which are configured to illuminate the sample with the modulation light from different illumination directions, and in that it comprises a computing unit which is configured to calculate a position of the emitter in the sample from the light emissions detected during the illumination of the sample with the modulation light in different illumination directions.

In a further embodiment of the light microscope, the modulation light is also the excitation light, and the light microscope comprises a common light source for the modulation light and the excitation light.

A further embodiment of the light microscope is characterized in that the computing unit is configured to calculate an apparent position of the emitter from light emissions that are detected when the sample is illuminated at the same angles of the modulation light, and to calculate the position of the emitter in the sample from the apparent positions. In particular, the computing unit is configured to calculate the position of the emitter in an additional spatial direction from the apparent positions calculated in one or two spatial directions.

In a further embodiment of the light microscope, the light microscope comprises a light modulator with a control device which is configured to shift a phase distribution or intensity distribution of the modulation light in a rear pupil of the objective lens. In this embodiment of the microscope, the light modulator is used to illuminate the sample with the modulation light from different illumination directions.

In a further embodiment of the light microscope, the scanner of the light microscope comprises two deflection elements which are configured to deflect the modulation light beam in the same deflection direction, wherein the scanner comprises a control device which is configured to displace the modulation light beam in the rear pupil of the objective lens independently of an angle of incidence into the pupil. In this embodiment of the microscope, the scanner is used to illuminate the sample with the modulation light from different illumination directions.

Advantageous further embodiments of the present disclosure are shown in the claims, the description and the drawings and the associated explanations of the drawings. The described advantages of features and/or combinations of features of the present disclosure are merely exemplary and may have an alternative or cumulative effect. With regard to the disclosure (but not the scope of protection) of the original application documents and the patent, the following applies: Further features can be found in the drawings—in particular the relative arrangements and active compounds shown.

The combination of features of different embodiments of the present disclosure or of features of different claims is also possible, in deviation from the selected back relations of the claims and is hereby suggested. This also applies to those features which are shown in separate drawings or are mentioned in their description. These features may also be combined with features of different claims. Likewise, features listed in the claims may be omitted for further embodiments of the present disclosure, but this does not apply to the independent claims of the granted patent.

DESCRIPTION OF THE FIGURES

Figure 1:
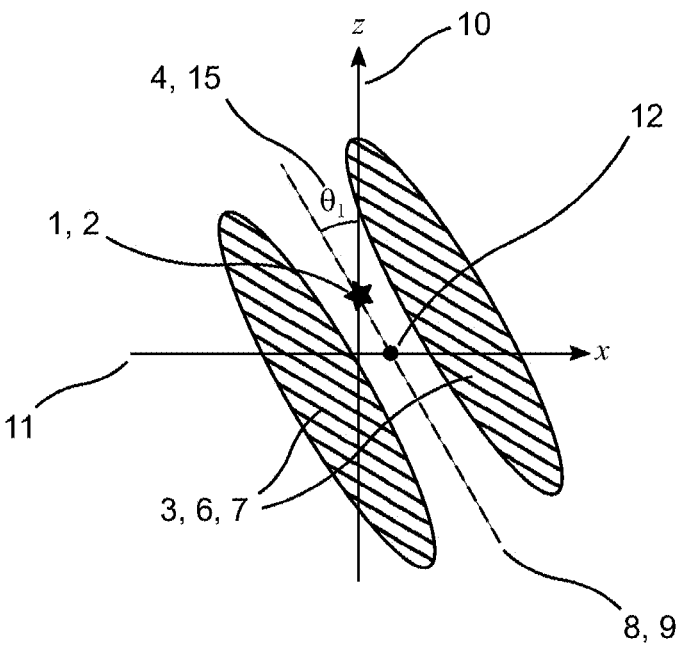
FIG. 1 illustrates the inventive idea of the method according to the present disclosure.
Figure 1:
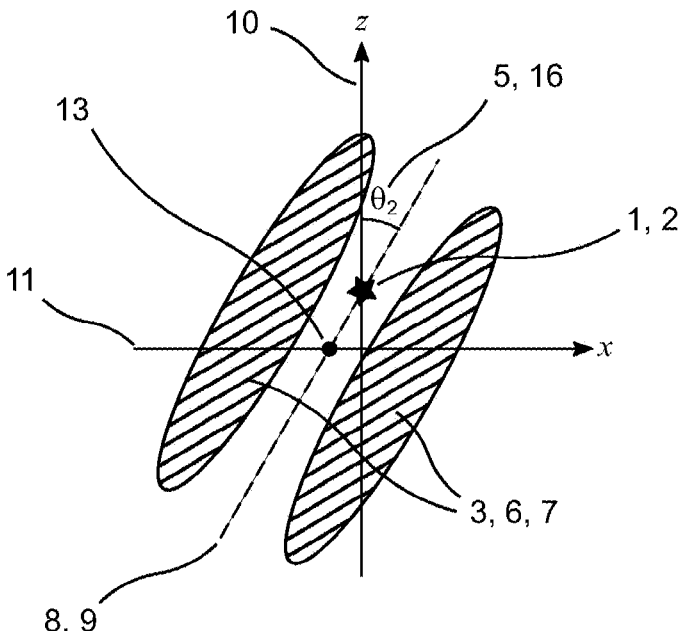

FIG. 1 shows the principle according to which the position 1 of an emitter 2 is determined by illuminating it with modulation light 3 from different illumination directions 4, 5. The modulation light 3 is configured here as excitation light 6, which excites the emitter 2 to emit light.

The modulation light 3 is used to form an intensity distribution 7 in the sample, which comprises a minimum line 9 formed here as a zero line 8. The figure shows a section through the xz plane, wherein the z axis corresponds to the optical axis 10 (of the objective lens not shown here) and the xy plane perpendicular to the drawing plane corresponds to the illumination plane 11. When the direction of illumination 4, 5 is changed, the intensity distribution 7 of the modulation light 3 is tilted relative to the optical axis 10 and the illumination plane 11, but not shifted perpendicular to the illumination plane 11. A device for shifting the intensity distribution 7 in the direction of the optical axis 10 in the sample is therefore not required.

In the embodiment shown, light emissions are detected for each of the illumination directions 4, 5 for different lateral positions of the modulation light 3, and a position of the emitter is calculated from these light emissions. This procedure corresponds to the MINFLUX method known from the prior art. However, due to the inclined intensity distributions 7, the two determined positions of the emitter 2 are not its actual position 1, but apparent positions 12, 13, which are projections of the position 1 into the illumination plane 11 along the illumination directions 4, 5. The actual position 1 of the emitter 2 in the x and z directions can be calculated from the apparent positions 12, 13 and the angles 14, 15.

Figure 2:
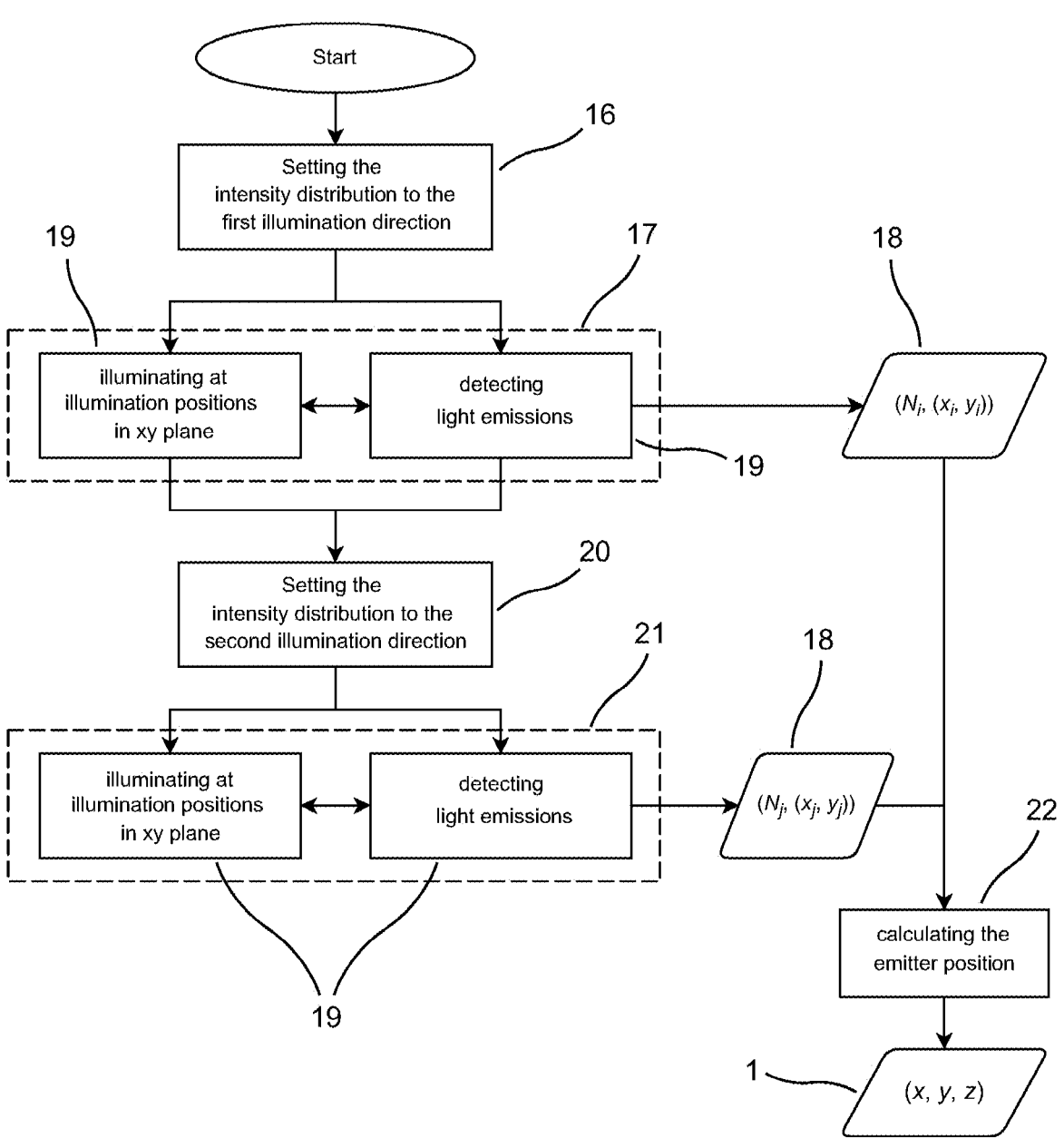
FIG. 2 shows a flow chart of one embodiment of the method.

FIG. 2 shows a general embodiment of the method in a flow chart. In the first step 16, the intensity distribution of the modulation light is set in a first illumination direction. In the second step 17, the sample is illuminated at illumination positions in the illumination plane (here the xy plane), wherein light emissions from the emitter are detected for the illumination positions and stored as data points $(N_i,(x_i, y_i))$ 18. Here $N_i$ stands for the amount of light detected at the position $(x_i, y_i)$ detected at the position or the emission events registered at this position. The sub-steps 19 of illuminating and detecting the light emissions are carried out repeatedly.

In the third step 20, the intensity distribution of the modulation light is adjusted in a second illumination direction. In the fourth step 21, the sample is illuminated at illumination positions in the illumination plane, wherein light emissions from the emitter to the illumination positions are detected and stored as data points $(N_j, (x_j, y_j))$ 18. The sub-steps 19 of illuminating and detecting the light emissions are again carried out repeatedly.

In the fifth step 22, the position (x, y, z) 1 of the emitter in the sample is calculated from the data points 18 detected in the second step 17 and the fourth step 21. The position 1 may be calculated by simultaneously using all data points 18 with a suitable estimator.

Figure 3:
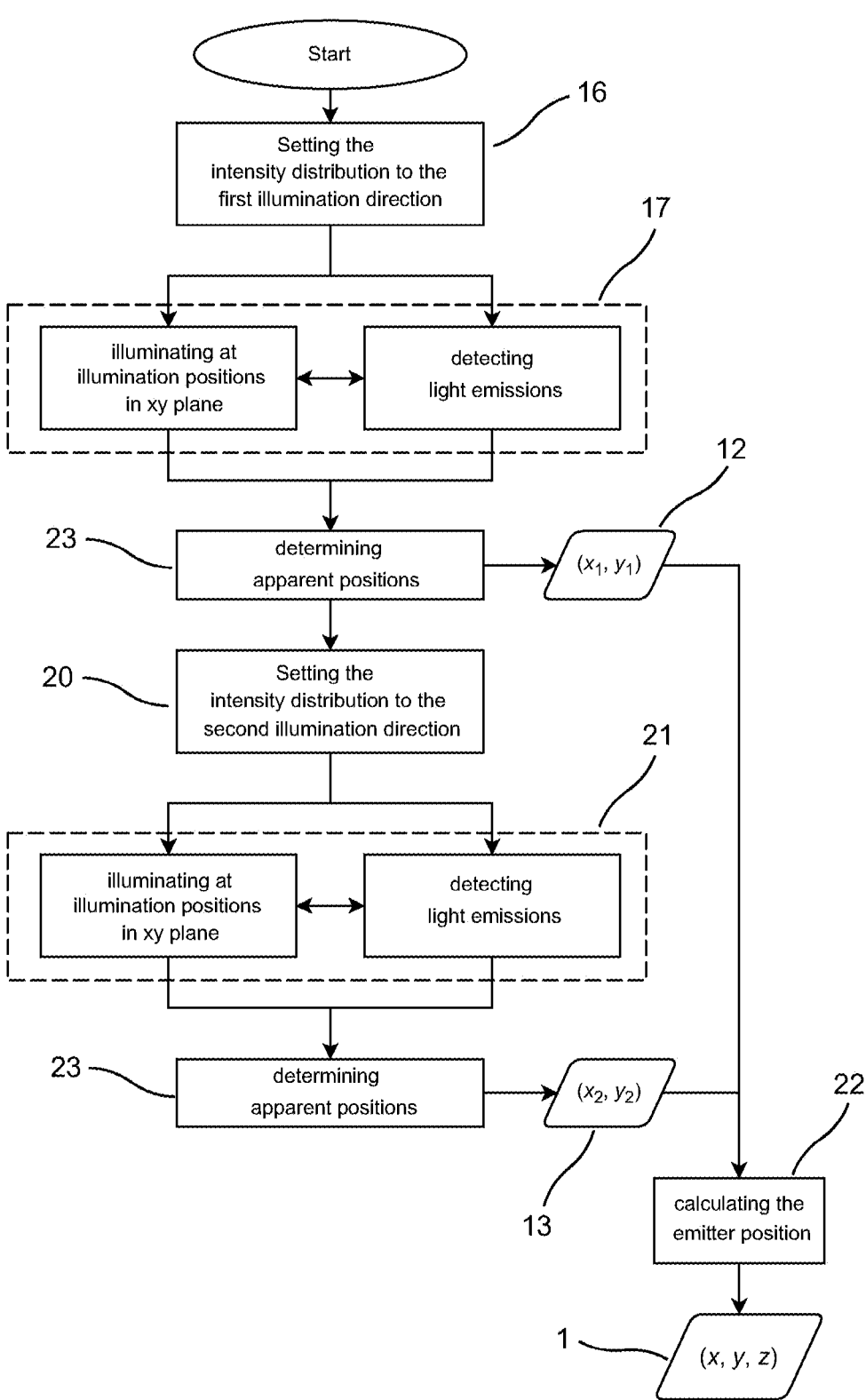
FIG. 3 shows a flow chart of a further embodiment of the method.

Alternatively, the data points 18 may first be evaluated separately for each of the directions of illumination and then combined to the position 1 of the emitter in the final calculation step 22. The corresponding flow chart is shown in FIG. 3. The steps of the method largely correspond to those in FIG. 1; however, calculation steps 23, in which an apparent position 12 or 13 is calculated from the previously recorded data points, are inserted after the data recording steps 17, 21. The final calculation of the position 1 of the emitter in step 22 is then carried out using the apparent positions 12, 13 and no longer the original data points 18.

Figure 4:
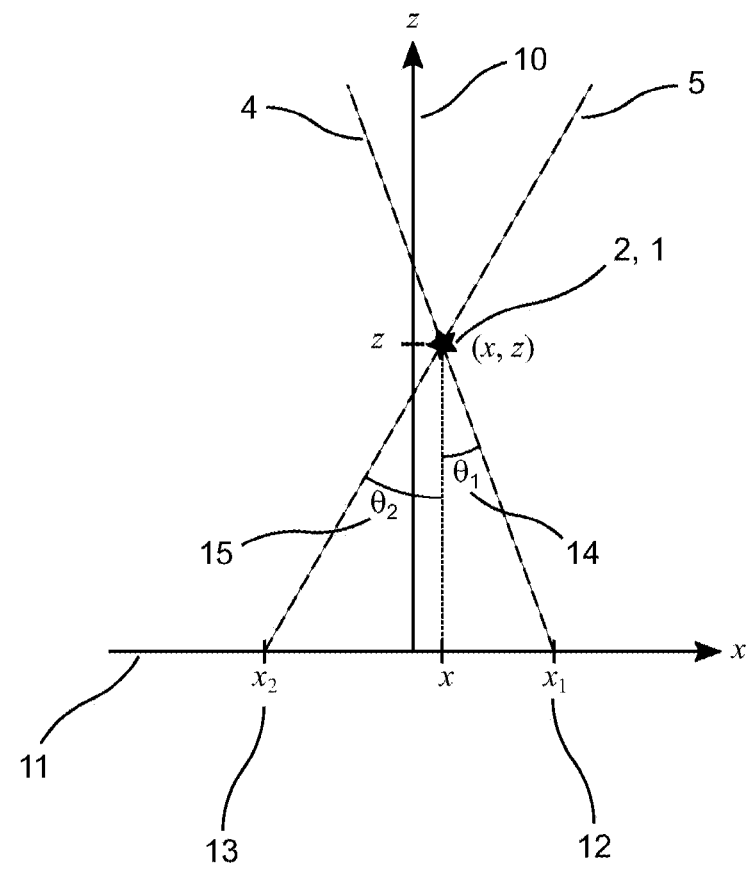
FIG. 4 shows the calculation of the emitter position from apparent positions in two dimensions.

FIG. 4 shows the calculation of the position 1 of the emitter 2 in two dimensions x and z from the apparent positions 12, 13 in the illumination plane 11. The apparent positions 12, 13 are obtained when the emitter 2 is localized according to a MINFLUX method as shown in FIG. 1, wherein the sample is not illuminated in the direction of the optical axis 10, but with intensity distributions of the modulation light inclined with respect to the optical axis 10, i.e., in different illumination directions 4, 5 (characterized by the inclination angles 14, 15). The following relationships between the inclination angles $(\theta_1, \theta_2)$ 14, 15, the apparent positions $(x_1, x_2)$ 12, 13 and the position (x, z) 1 of the emitter 2 can be deduced directly from the figure:

$$z \tan \theta_1 = x_1 - x \qquad (1)$$

$$z \tan \theta_2 = x - x_2 \qquad (2)$$

Solving the system of equations results in the reconstruction formula 24, which can be used to calculate the position 1 of the emitter 2 in the xz plane. The reconstruction is shown for the general case that the inclination angles 14, 15 are not only different in direction but also in magnitude. In the case that the magnitudes of the inclination angles 14, 15 are equal (i.e. $|\theta_1|=|\theta_2|$), the reconstruction formula 24 is reduced to the symmetrical case in which the x coordinate is the mean value of the apparent positions $x=(x_1+x_2)/2$.

Figure 5:
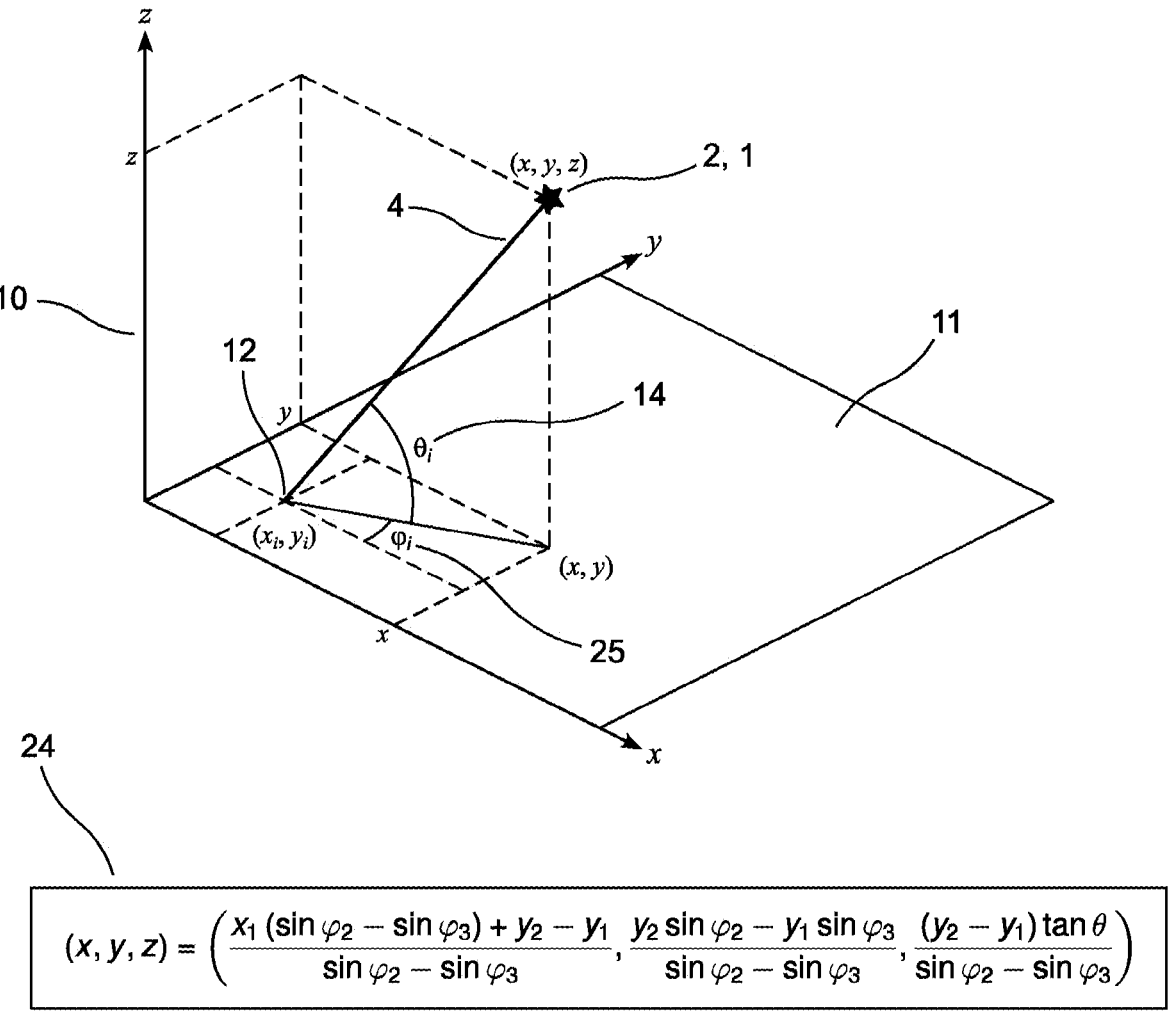
FIG. 5 shows an extension to three dimensions.

Based on the illustration in FIG. 5, a relationship can be derived between the apparent position 12 of the emitter 2 in the focal plane 11 and the actual position 1 of the emitter 2 in three-dimensional space when the emitter 2 is localized with modulation light from the illumination direction 4. For a given azimuth angle 25 $\varphi_i$ and inclination angle 14 $\theta_i$ of the illumination direction 4, the following applies according to the drawing:

$$z \sin \varphi_i = (y - y_i) \tan \theta_i$$

or $$z \cos \varphi_i = (x - x_i) \tan \theta_i$$

For example, if the emitter is localized at three azimuth angles 25 ($\varphi_1=0°$, $\varphi_2=120°$, $\varphi_3=240°$) evenly distributed around the optical axis 10 and at a constant angle of inclination $\theta$ and the apparent positions 12 $(x_1, y_1)$, $(x_2, y_2)$ and $(x_3, y_3)$ are determined, the position 1 of the emitter 2 can be calculated from the apparent positions according to the reconstruction formula 24.

Figure 6:
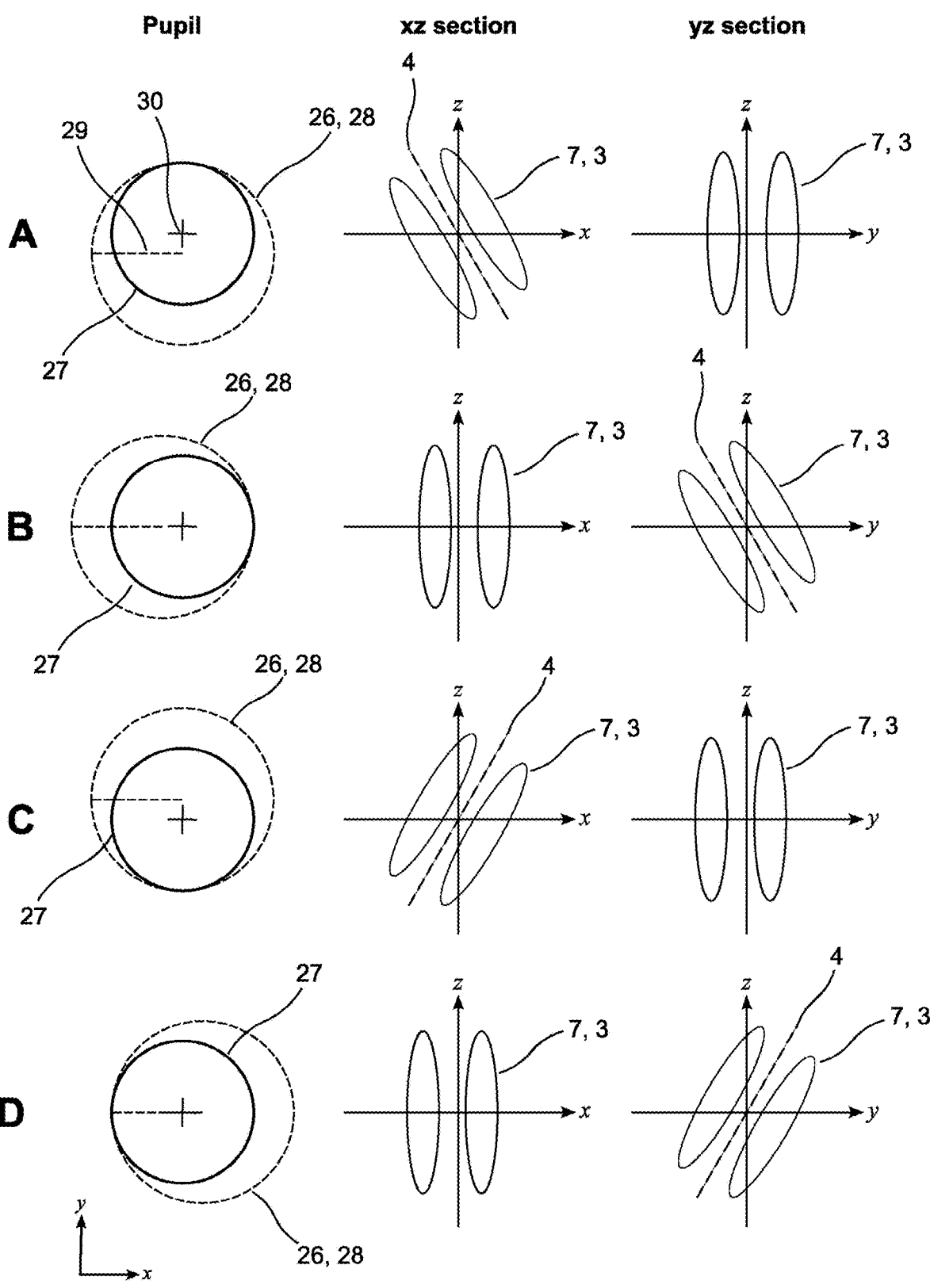
FIG. 6 shows an embodiment for generating inclined intensity distributions.

FIG. 6 shows schematically how different illumination directions 4 can be generated by shifting the modulation light beam 26 in a pupil 27 of the objective lens. A modulation light beam 26 with a helical phase pattern 28 is shown, which comprises a phase increase in the azimuthal direction from 0 to $2\pi$ and a phase jump 29.

Line A shows a shift of the phase pattern 28 relative to the center 30 of the pupil 27 in the −y direction, whereby the intensity distribution 7 of the modulation light 3 is inclined in the xz section in the sample but remains upright perpendicular to it in the yz section. The inclination of the intensity distribution 7 may be accompanied by a (slight) translational shift in the y direction.

Line B shows a shift of the phase pattern 28 relative to the center 30 of the pupil 27 in the −x direction, whereby the intensity distribution 7 of the modulation light 3 is inclined in the yz section in the sample but remains upright perpendicular to it in the xz section.

Line C shows a shift of the phase pattern 28 relative to the center 30 of the pupil 27 in the +y direction, whereby the intensity distribution 7 of the modulation light 3 is inclined in the xz section in a direction opposite to the case shown in line A.

Line D shows a shift of the phase pattern 28 relative to the center 30 of the pupil 27 in the +x direction, whereby the intensity distribution 7 of the modulation light 3 is inclined in the yz section in a direction opposite to the case shown in line B.

Figure 7:
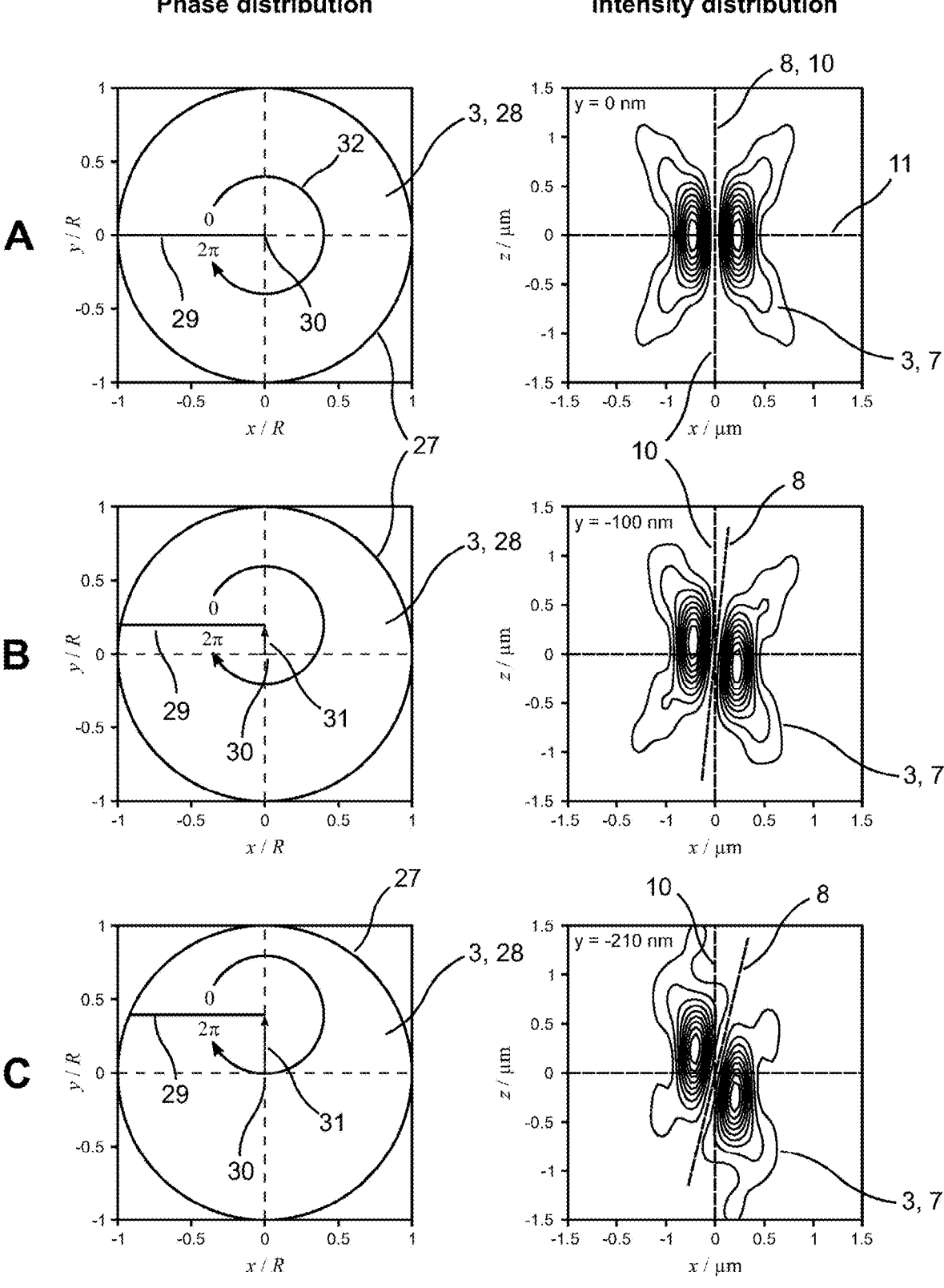
FIG. 7 shows a simulation for generating inclined intensity distributions.

FIG. 7 shows how the intensity distribution of the modulation light 3 in the sample inclines with increasing displacement 31 of the phase pattern 28 in the pupil 27 relative to the optical axis 10 (simulation). As in FIG. 6, the modulation light 3 entering the pupil 27 comprises a helical phase pattern 28 with an azimuthal phase increase 32 from 0 to $2\pi$ and a phase jump 29. Focusing through the objective lens results in an annular intensity distribution 7 of the modulation light 3 with a zero line 8, wherein the zero line 8 coincides with the optical axis 10 when the phase pattern 28 is centered in the pupil 27 (line A). With a slight displacement 31 of the phase pattern 28 in the y direction relative to the center 30 of the pupil 27, the zero line 8 of the intensity distribution 7 begins to incline in the $\pi$ direction relative to the optical axis 10, with a simultaneous translation of the intensity distribution 7 in the direction of the displacement 31 of the phase pattern 28 (i.e. in the y direction) (line B); the zero line thereby shifts into the plane defined by y=−100 nm. With a greater displacement 31 of the phase pattern 28 relative to the center 30 of the pupil 27, the inclination of the zero line 8 of the intensity distribution 7 increases in the $\pi$ direction and the translation increases in the y direction (line C). The intensity distributions 7 shown are calculated for a homogeneous illumination of the pupil 27, i.e. a constant intensity of the modulation light 3 across the pupil 27.

Figure 8:
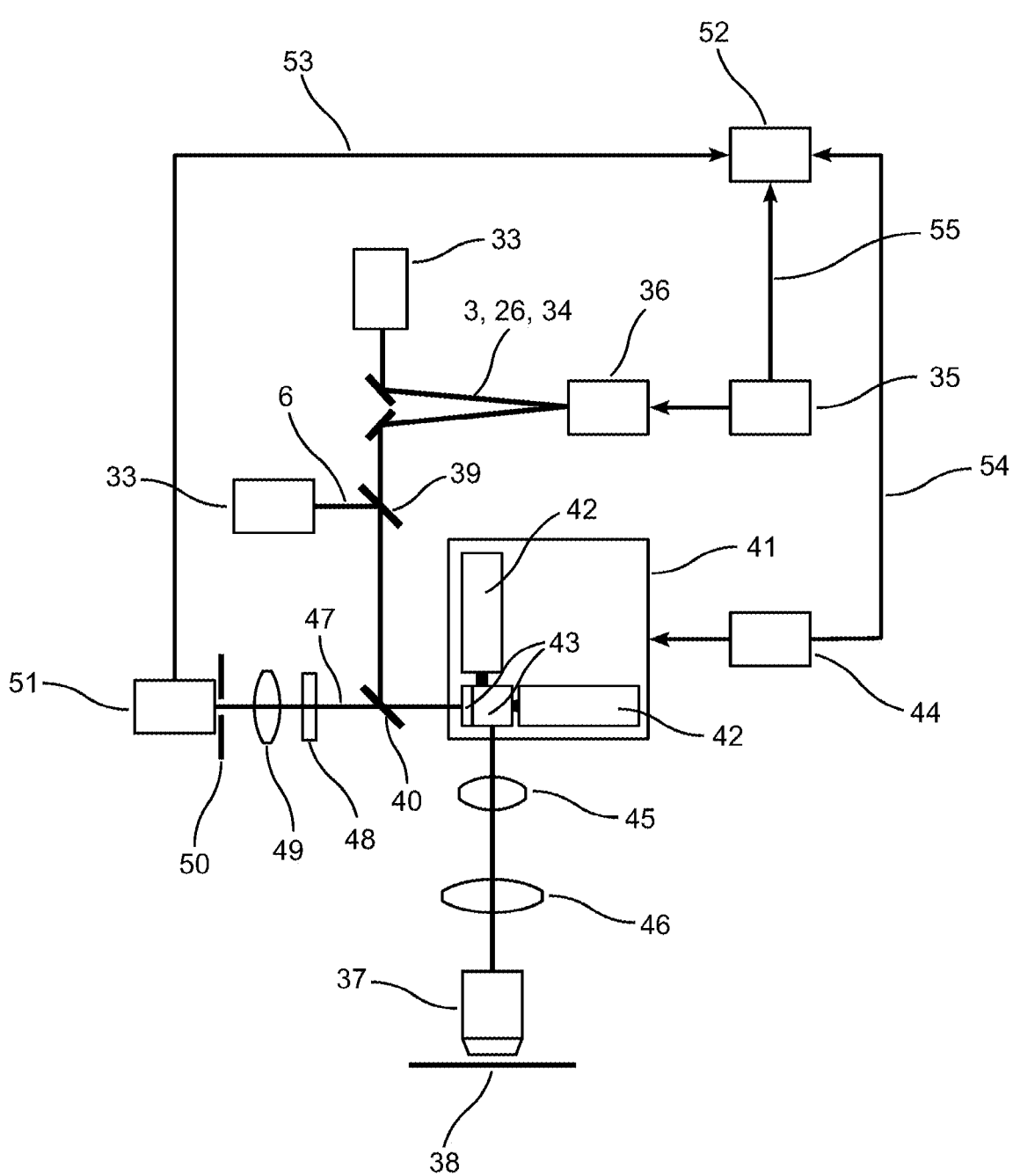
FIG. 8 shows a microscope according to the present disclosure.

FIG. 8 shows a light microscope according to the present disclosure, specifically an embodiment as a STED-MIN-FLUX microscope. The light microscope comprises a light source 33 for excitation light 6 and a light source 33 for modulation light 3, which here is emission suppression light or stimulation light 34 and suppresses the light emission of the emitters in the sample 38. The modulation light 3 is guided with mirrors via a light modulator 36 controlled by a programmable wavefront controller 35, which imposes a variable phase pattern on the wavefront of the modulation light 3 so that the modulation light 3 forms an intensity distribution with a linear or planar intensity minimum in the sample 38 when focused with the objective lens 37. The wavefront controller 35 is configured to display the phase pattern presented on the light modulator 36 in different positions relative to the incident modulation light beam 26, so that the phase pattern is centered at different positions in the pupil of the objective lens 37 and the intensity distribution of the modulation light 3 is inclined relative to the optical axis of the objective lens (corresponding to the representations in FIGS. 6 and 7).

The excitation light 6 and the modulation light 3 are coupled into the scanner 41 with the main beam splitter 40 using a beam combiner 39. The scanner 41 is configured as a galvo scanner and enables the joint excitation and modulation light beam to be deflected in two spatial directions. For this purpose, the scanner 41 comprises two tilting mirrors 43, each mounted on a galvo motor 42, whose axes of rotation are perpendicular to each other, i.e., two galvo scanners that deflect the light beam in spatial directions oriented perpendicular to each other. The galvo motors 42 for positioning the excitation light 6 and the modulation light 3 in the sample 38 are controlled via a scan controller 44. In the example shown, the tilting mirrors 43 are each positioned close to a pupil, i.e., close to a plane that is conjugate to the rear pupil of the objective lens 37. In an alternative arrangement, not shown in the figure, a relay optic may be located between the two galvo scanners, in which case both tilting mirrors 43 are particularly each placed in a pupil.

The light emerging from the scanner 41 is imaged via a scan lens 45 and a tube lens 46 into the rear pupil of the objective lens 37, which focuses the excitation light 6 into the sample 38. A change in the angle of the tilting mirror 43 translates into a change in the angle of the light beam in the pupil of the objective lens 37 and thus into a displacement of the focused excitation light 6 and modulation light 3 in the sample 38.

Emission light 47 emitted by the emitters in the sample 38 is collected by the objective lens 37 and travels in the opposite direction to the excitation and modulation light beams to the main beam splitter 40, which transmits the emission light 47 and thus separates it from the excitation light 6 and the modulation light 3. The main beam splitter 40 may be configured in particular as a (dichroic) color splitter. The detection system arranged behind the main beam splitter 40 comprises a filter 48, which blocks unwanted stray light components, and a lens 49, with which the emission light 47 emitted by the emitters is focused through a (confocal) pinhole 50 onto the detector 51.

The illustrated STED MINFLUX microscope differs from a conventional confocal microscope and from (STED) MIN-FLUX microscopes known from the prior art in that the microscope comprises a computing unit 52 which calculates a position of an emitter in the sample 38 from detection signals 53 generated by the detector 51, position signals 54 provided by the scan controller 44, and identification signals 55 representing the phase patterns presented by the light modulator 36.

Figure 9:
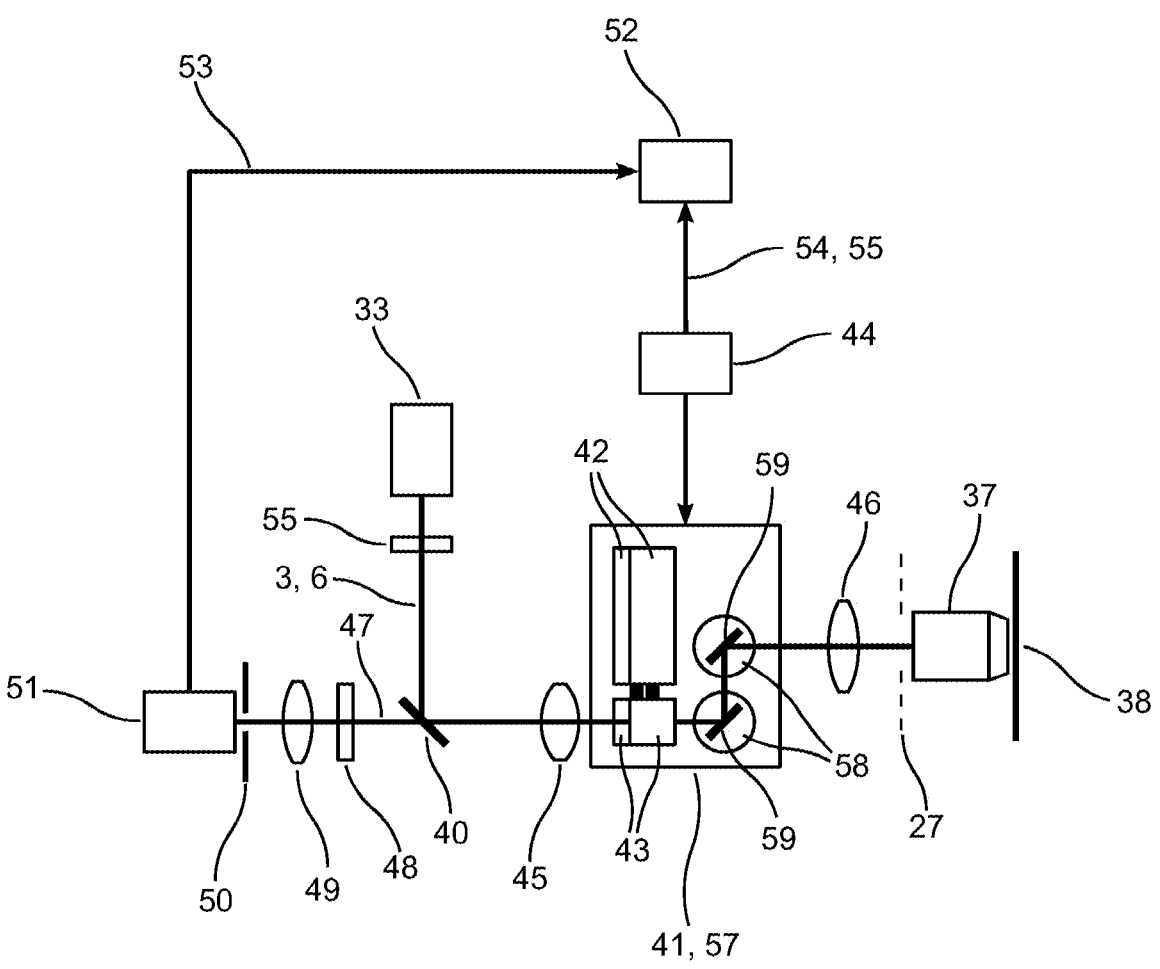
FIG. 9 shows a microscope according to the present disclosure.

FIG. 9 shows a further light microscope according to the present disclosure, here an embodiment as a MINFLUX microscope. In contrast to the STED-MINFLUX microscope shown in FIG. 8, here the excitation light 6 provided by the light source 33 is also the modulation light 3. Instead of a light modulator, the microscope comprises a (vortex) phase plate 55 in the light path of the modulation light 3, which imprints a helical phase pattern on the wavefront of the modulation light 3, so that the modulation light 3 forms a donut-shaped intensity distribution with a linearly extended intensity minimum in the sample 38 when focused with the objective lens 37. The scanner 41 is configured as a quad scanner 57, i.e., it comprises pairs of tilting mirrors 43 and 59 for each of the two deflection directions, which are driven by pairs of galvo motors 42 and 58. The two tilting mirrors 43 and 59 per deflection direction make it possible to adjust both the position and the inclination at which the light beam falls into the rear pupil 27 of the objective lens 37 independently of one another. By shifting the light beam, an image of the phase plate 55 can be translated in the pupil 27, allowing the illumination direction of the modulation light 3 in the sample 38 to be varied. The illumination direction is set here via the scan controller 44, which transmits both a position signal 54 and an identification signal 55 encoding the illumination direction to the computing unit 52. If an inclination of the intensity distribution of the modulation light 3 in the sample 38 in one direction is sufficient, an X2Y scanner, which comprises two tilting mirrors for only one of the two deflection directions can alternatively be used instead of a quad scanner.

Figure 10:
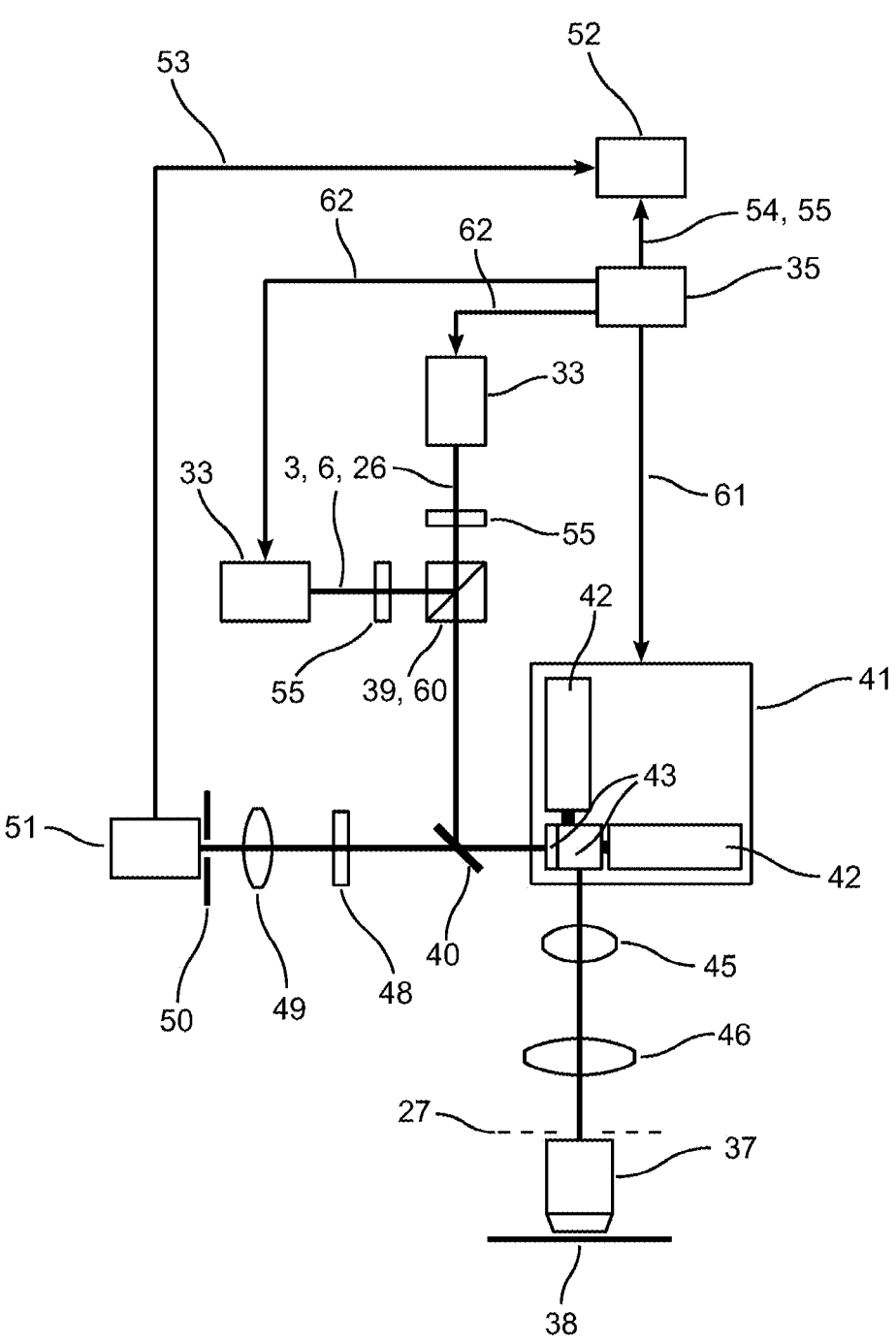
FIG. 10 shows a microscope according to the present disclosure.

The other components of the microscope correspond to those of the microscope shown in FIG. 8. FIG. 10 shows a further light microscope according to the present disclosure. As in the embodiment shown in FIG. 8, the excitation light 6 is also the modulation light 3 here. The MINFLUX microscope shown is characterized by the fact that the excitation light 6 is provided by two separately switchable light sources 33, which are combined with a beam combiner 39 configured as a polarization beam splitter 60. A phase plate 55 is arranged in the path of each of the modulation light beams 26, which imprints helical phase patterns on the wave fronts of the modulation light beams 26, so that the modulation light 3 of the modulation light beams 26 forms donut-shaped intensity distributions with linear intensity minima in the sample 38 when focused with the objective lens 37. In the embodiment shown, the phase plates 55 are independently positionable and adjusted so that the phase plates 55 are imaged to different positions in the rear pupil 27 of the objective lens 37. As a result, the sample 38 can be illuminated with the modulation light 3 in different illumination directions, depending on which of the two light sources 33 is used to illuminate the sample 38.

In this embodiment, the scan controller 35 of the light microscope generates not only control signals 61, with which the galvo motors 42 of the scanner 41 are controlled, but also control signals 62, with which the light sources 33 are switched, so that the sample 38 can be illuminated alternately with the two light sources 33 and in different illumination directions. In addition to the position signal 54, the scan controller 35 also transmits an identification signal

55 encoding the activated light source 33 or the illumination direction to the computing unit 52.

LIST OF REFERENCE SYMBOLS

1 Position
2 Emitter
3 Modulation light
4 Illumination direction
5 Illumination direction
6 Excitation light
7 Intensity distribution
8 Zero line
9 Minimum line
10 Optical axis
11 Illumination plane
12 apparent position
13 apparent position
14 Angle
15 Angle
16 First step
17 Second step
18 Data points
19 Substep
20 Third step
21 Fourth step
22 Fifth step
23 Calculation step
24 Reconstruction formula
25 Azimuth angle
26 Modulation light beam
27 Pupil
28 Phase pattern
29 Phase jump
30 Center
31 Displacement
32 Phase increase
33 Light source
34 Stimulation light
35 Wavefront controller
36 Light modulator
37 Objective lens
38 Sample
39 Beam combiner
40 Main beam splitter
41 Scanner
42 Galvo motor
43 Tilting mirror
44 Scan controller
45 Scan lens
46 Tube lens
47 Emission light
48 Filter
49 Lens
50 Pinhole
51 Detector
52 Computing unit
53 Detection signal
54 Position signal
55 Identification signal
56 Phase plate
57 Quad scanner
58 Galvo motor
59 Tilting mirror
60 Polarization beam splitter
61 Control signal
62 Control signal

The invention claimed is:

1. A method for localizing or tracking an individual emitter in a sample, wherein the sample is illuminated through an objective lens with excitation light, which excites the individual emitter to emit light, and with modulation light, which attenuates, amplifies, or excites the light emission of the emitter, wherein the modulation light forms an intensity distribution in the sample with an intensity minimum extended along a minimum line or a minimum area, in particular with a zero line or a zero area, the method comprising:

detecting light emissions of the emitter for several illumination positions of the modulation light in a close range around the emitter, and calculating a position of the emitter in the sample from the emissions detected for the illumination positions, wherein the sample is illuminated with the modulation light in different illumination directions during the detection of the light emissions, wherein the light emissions are assigned or assignable to the different illumination directions.

2. The method according to claim 1, wherein the modulation light is the excitation light.

3. The method according to claim 1, wherein the illumination positions lie on an illumination line, which is particularly oriented perpendicular to an optical axis of the objective lens, or in an illumination plane, which is particularly oriented perpendicular to the optical axis.

4. The method according to claim 3, wherein the calculation of the position of the emitter comprises a calculation of a distance from the emitter to the illumination line or the illumination plane.

5. The method according to claim 1, wherein the illumination directions, in which the sample is illuminated with the modulation light, are measured in a calibration step preceding the method, and the calculation of the position of the emitter in the sample is carried out using the measured illumination directions.

6. The method according to claim 1, wherein apparent positions of the emitter are calculated from subsets of light emissions which are detected during the illumination of the sample with the modulation light from the same illumination direction, and the position of the emitter in the sample is calculated from the apparent positions.

7. The method according to claim 6, wherein the position of the emitter in the sample is calculated in at least one spatial direction more than the apparent positions.

8. The method according to claim 7, wherein;

the detection of light emissions for a plurality of illumination positions of the modulation light in a close range around the emitter and the calculation of the position of the emitter in the sample from the light emissions detected for the illumination positions are carried out in a first iteration of the method;

the illumination line or the illumination plane is displaced so that the distance of the emitter from the illumination line or the illumination plane is reduced; and the detection of light emissions for a plurality of illumination positions of the modulation light in a close range around the emitter and the calculation of the position of the emitter in the sample from the light emissions detected for the illumination positions are carried out in a second iteration of the method, wherein the position of the emitter is calculated with a smaller position error compared to the first iteration.

9. The method according to claim 8, wherein further iterations of the method are carried out until the distance between the apparent positions or the position uncertainty with which the position of the emitter is calculated falls below a threshold or does not decrease further compared to the previous iteration.

10. The method according to claim 1, wherein the illumination direction in which the sample is illuminated with the modulation light is changed by displacement of a phase distribution or intensity distribution of the modulation light in a rear pupil of the objective lens.

11. The method according to claim 10, wherein the displacement is set with a beam scanner.

12. The method according to claim 1, wherein the illumination direction in which the sample is illuminated with the modulation light is changed using a programmable light modulator.

13. The method according to claim 1, wherein the direction of illumination, in which the sample is illuminated with the modulation light, is changed by alternately illuminating the sample with different beams of the modulation light.

14. The method according to claim 1, wherein the method is carried out repeatedly on a single emitter or on a plurality of emitters, which bind individually and successively to an object in the sample, and a three-dimensional trajectory of the emitter or of the object is created from the calculated positions of the emitter or of the emitters.

15. The method according to claim 1, wherein the method is carried out with a plurality of individual emitters in the sample and an image representation is generated from the calculated positions of the emitters.

16. The method according to claim 15, wherein a plurality of emitters bind transiently at a plurality of binding sites on a structure in the sample, wherein the binding sites may be occupied by only one emitter at any one time.

17. A light microscope for localizing or tracking an individual emitter in a sample comprising:

a light source for excitation light, which is adapted to excite the individual emitter in the sample to emit light;

a light source for modulation light which is adapted to attenuate, amplify or excite the light emission of the emitter in the sample;

an objective lens which is configured to illuminate the sample with the excitation light and the modulation light;

optical means which are configured to form an intensity distribution of the modulation light in the sample in such a way that the intensity distribution comprises an intensity minimum extended along a minimum line or a minimum area, in particular a zero line or a zero area;

a scanner which is configured to position the intensity distribution of the modulation light in the sample at different illumination positions in a close range around the emitter; and a detection device which is configured to detect light emissions of the emitter for the illumination positions, wherein the light microscope comprises means which are configured to illuminate the sample with the modulation light from different illumination directions, and a computing unit which is configured to calculate a position of the emitter in the sample from the light emissions detected during the illumination of the sample with the modulation light in different illumination directions.

18. The light microscope according to claim 17, wherein the modulation light is the excitation light and the light microscope comprises a common light source as light source for the modulation light and as light source for the excitation light.

19. The light microscope according to claim 17, wherein the computing unit is configured to calculate an apparent position of the emitter from light emissions which are detected during the illumination of the sample in the same illumination directions of the modulation light and to calculate the position of the emitter in the sample from the apparent positions.

20. The light microscope according to claim 19, wherein the computing unit is configured to calculate the position of the emitter in an additional spatial direction from the apparent positions calculated in one or two spatial directions.

21. The light microscope according to claim 17, wherein the optical means comprise a light modulator with a control device configured to shift a phase distribution or intensity distribution of the modulation light in a rear pupil of the objective lens.

22. The light microscope according to claim 17, wherein the scanner comprises two deflection elements which are configured to deflect the modulation light beam in the same deflection direction, wherein the scanner comprises a control device which is configured to displace the modulation light beam in a rear pupil of the objective lens independently of an angle of incidence into the pupil.

* * * * *